(12) United States Patent
Kamei et al.

(10) Patent No.: US 8,297,420 B2
(45) Date of Patent: Oct. 30, 2012

(54) METHOD FOR MANUFACTURING AN OVERRUNNING CLUTCH

(75) Inventors: Koichiro Kamei, Tokyo (JP); Kazuhiro Odahara, Tokyo (JP); Hidekazu Katayama, Tokyo (JP); Jiro Hirao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1575 days.

(21) Appl. No.: 11/715,957

(22) Filed: Mar. 9, 2007

(65) Prior Publication Data

US 2008/0053777 A1 Mar. 6, 2008

(30) Foreign Application Priority Data

Aug. 29, 2006 (JP) ................................ 2006-231946

(51) Int. Cl.
*B23Q 17/00* (2006.01)
(52) U.S. Cl. ..... 192/45.001; 29/434; 29/445; 29/407.05
(58) Field of Classification Search ............... 29/407.05, 29/434, 445; 192/45
See application file for complete search history.

(56) References Cited

U.S. PATENT DOCUMENTS

| | | | |
|---|---|---|---|
| 2,631,706 A * | 3/1953 | Dodge | 192/45.1 |
| 2,684,139 A * | 7/1954 | Lewis | 192/45 |
| 5,722,521 A * | 3/1998 | Awaji et al. | 192/45 |
| 6,382,037 B1 * | 5/2002 | Kobayashi et al. | 74/7 A |
| 6,389,693 B1 * | 5/2002 | Aranda et al. | 29/890 |
| 6,701,617 B2 * | 3/2004 | Li et al. | 29/890 |
| 6,749,050 B2 * | 6/2004 | Ouchi | 192/45 |
| 6,757,975 B1 * | 7/2004 | Todd et al. | 29/893.33 |
| 6,988,314 B2 * | 1/2006 | Kobayakawa | 29/888.01 |
| 7,147,091 B2 * | 12/2006 | Iga et al. | 192/45 |
| 2003/0141161 A1 * | 7/2003 | Ouchi | 192/45 |
| 2004/0123442 A1 * | 7/2004 | Maeda | 29/407.05 |
| 2004/0178039 A1 * | 9/2004 | Ichihara et al. | 192/45 |
| 2004/0200684 A1 * | 10/2004 | Aida et al. | 192/45 |
| 2005/0087417 A1 * | 4/2005 | Shimomura et al. | 192/45 |
| 2006/0015204 A1 * | 1/2006 | Carlstedt et al. | 700/101 |
| 2006/0130306 A1 * | 6/2006 | Keller | 29/407.05 |
| 2008/0052907 A1 * | 3/2008 | Cai et al. | 29/890 |
| 2008/0053778 A1 * | 3/2008 | Shimomura et al. | 192/45 |

FOREIGN PATENT DOCUMENTS

JP 59-26107 Y2 7/1984
JP 7-113383 B2 12/1995

* cited by examiner

*Primary Examiner* — Jermie Cozart
*Assistant Examiner* — Christopher Koehler
(74) *Attorney, Agent, or Firm* — Sughrue Mion, PLLC (57) ABSTRACT

Rollers and springs are installed in notch portions of a clutch outer (S104), an inscribed circle diameter of the rollers is measured in a state in which the rollers are placed in contact with stopping portions by pressure from the springs (S105), and an outside diameter of a cylindrical portion is determined from the inscribed circle diameter measured value such that a predetermined amount of roller bite is achieved (S106). Then, the outside diameter of the cylindrical portion is finished so as to have the determined value of the outside diameter (S108). An overrunning clutch is assembled by pairing together the clutch outer, rollers, and springs and the clutch inner (S110).

16 Claims, 5 Drawing Sheets

METHOD FOR MANUFACTURING AN OVERRUNNING CLUTCH

BACKGROUND OF THE INVENTION

1. Field of the Invention

The present invention relates to a method for manufacturing an overrunning clutch that is used in an engine starting apparatus, etc., for example.

2. Description of the Related Art

In conventional methods for manufacturing overrunning clutches, in apparatuses that include: a tubular driving body that has a plurality of tapered notches formed circumferentially on an inner circumferential portion; a transmitting body that has a first end portion that is inserted into the inner circumferential portion of the driving body so as to form wedge-shaped spaces between an outside diameter portion of the first end portion and the notch portions; and rollers that are mounted into the wedge-shaped spaces so as to be movable in a circumferential direction, and in which a driving force is transmitted from the driving body through the rollers to the transmitting body by unidirectional rotation, upper limits of unidirectionally transmitted torque have been suppressed to predetermined values by disposing stopping portions that project inward at the narrow ends of the wedge-shaped spaces on the inner circumferential portion of the driving body at uniform positions in a circumferential direction such that the rollers come into contact with the stopping portions at positions where they bite into narrow portions of the wedge-shaped spaces, and restricting the amount of bite of the rollers at the contact positions so as to be at a required amount when the diameter of the outside diameter portion of the first end portion of the transmitting body, which is made larger as a preventive measure, becomes smaller (see Patent Literature 1, for example).

Specifically, a driving body that has predetermined dimensions is prepared by preparing a driving body in which a plurality of tapered notches are formed by cold forging, forming portions that cannot be formed precisely by cold forging, such as end surfaces, etc., by machining, and subsequently applying heat treatment in order to ensure mechanical strength. Similarly, a transmitting body that has predetermined dimensions is prepared by preparing a transmitting body by cold forging, forming portions that cannot be formed precisely by cold forging, such as end surfaces, etc., by machining, and subsequently applying heat treatment in order to ensure mechanical strength. Here, the outside diameter of the first end portion of the transmitting body that is to be inserted into the inner circumferential portion of the driving body is formed so as to be enlarged. Then, the outside diameter of the first end portion of the transmitting body is finished such that the upper limit of the transmitted torque is at a predetermined value.

Next, an overrunning clutch is produced by combining a driving body, a transmitting body, rollers, springs, etc., that are each prepared so as to have predetermined dimensions.
Patent Literature 1: Japanese Patent Publication No. HEI 7-113383 (Gazette)

In conventional methods for manufacturing overrunning clutches, the upper limit of the transmitted torque depends on the amount of bite when the rollers come into contact with the stopping portions that are disposed on the driving body. Because the overrunning clutch is produced by combining parts such as the driving body, the transmitting body, the rollers, etc., that have been prepared separately, one disadvantage has been that the upper limit of the transmitted torque becomes irregular due to irregularities in the inside radii of the notch portions, irregularities in the positions where the stopping portions are formed, irregularities of the outside diameters of the rollers, and irregularities in the outside diameter of the first end portion of the transmitting body, etc.

In addition, if an attempt is made to ensure a minimum required transmitted torque with consideration for irregularities in each of the parts, target values for each of the parts must be set somewhat higher, inevitably also making the upper limit of irregularities in each of the parts higher. Even in that case, size must be increased in order to prevent damage, giving rise to increases in the size and weight of the machinery. It is difficult to raise precision, particularly in the driving body, since heat treatment is applied after cold forging, giving rise to quench warping.

It is also conceivable for irregularities in the upper limit of the transmitted torque to be suppressed by measuring the inner circumferential shape of the driving body and selecting and combining the rollers or the transmitting body based on the results of that measurement. However, because the inner circumferential shape of the driving body is complex, the inner circumferential shape of the driving body must be measured by a three-dimensional measuring instrument, requiring a lot of measuring time. In addition, since the amount of bite of the rollers at the contact positions is found using complex formulae based on such measured values, it has been difficult to calculate the amount of bite with high precision.

SUMMARY OF THE INVENTION

The present invention aims to solve the above problems and an object of the present invention is to provide a method for manufacturing an overrunning clutch that enables increases in size to be suppressed and that enables production to be simplified by installing rollers in notch portions of a clutch outer, measuring an inscribed circle diameter of the rollers when placed in contact with stopping portions, and determining an outside diameter of a cylindrical portion of a clutch inner from that measured value of the inscribed circle diameter to suppress irregularities in transmitted torque.

In order to achieve the above object, according to one aspect of the present invention, there is provided a method for manufacturing an overrunning clutch including: a tubular clutch outer that has a plurality of tapered notch portions formed circumferentially on an inner circumferential portion; a clutch inner that has a cylindrical portion disposed at a first end, the cylindrical portion being inserted into the inner circumferential portion of the clutch outer such that wedge-shaped spaces are formed between an outer circumference of the cylindrical portion and the notch portions; rollers that are mounted into the wedge-shaped spaces so as to be movable circumferentially; springs that press the rollers toward narrow ends of the wedge-shaped spaces; and stopping portions that are disposed on the inner circumferential portion of the clutch outer so as to project inward at narrow end positions of each of the wedge-shaped spaces, a driving force being transmitted from the clutch outer through the rollers to the clutch inner by unidirectional rotation. The method for manufacturing an overrunning clutch includes steps of: installing the rollers and the springs in each of the notch portions of the clutch outer; measuring an inscribed circle diameter of the rollers in a state in which the rollers are respectively placed in contact with the stopping portions by pressure from the springs; and determining an outside diameter of the cylindrical portion from a measured value of the inscribed circle diameter such that an amount of roller bite is at a predetermined amount at a position at which the rollers come into contact with the stopping portions.

According to the present invention, because the rollers and the springs are installed in each of the notch portions of the clutch outer and the inscribed circle diameter of the rollers is measured in a state in which the rollers are respectively placed in contact with the stopping portions by the pressure from the springs, measuring instruments such as three-dimensional measuring instruments, etc., are unnecessary, enabling the inscribed circle diameter to be measured easily and with high precision.

The measured value of the inscribed circle diameter is a value specific to an assembly including a clutch outer, rollers, and springs, and is not affected by irregularities in the inner circumferential radii of the notch portions, irregularities in the positions of formation of the stopping portions, or irregularities in the outside diameters of the rollers. Similarly, the outside diameter of the cylindrical portion of the clutch inner that is determined from that measured value of the inscribed circle diameter is also not affected by irregularities in the inner circumferential radii of the notch portions, irregularities in the positions of formation of the stopping portions, or irregularities in the outside diameters of the rollers. Thus, irregularities in the upper limit of the transmitted torque that result from irregularities in the inside radii of the notched portions, irregularities in the positions where the stopping portions are formed, irregularities in the outside diameters of the rollers, irregularities in the outside diameter of the cylindrical portion, etc., are suppressed.

Because it is not necessary to consider irregularities in each of the parts, it is no longer necessary to set higher target values for each of the parts, thereby suppressing increases in size and avoiding increases in the size and weight of the machinery.

DETAILED DESCRIPTION OF THE PREFERRED EMBODIMENTS

Embodiment 1

Figure 1:
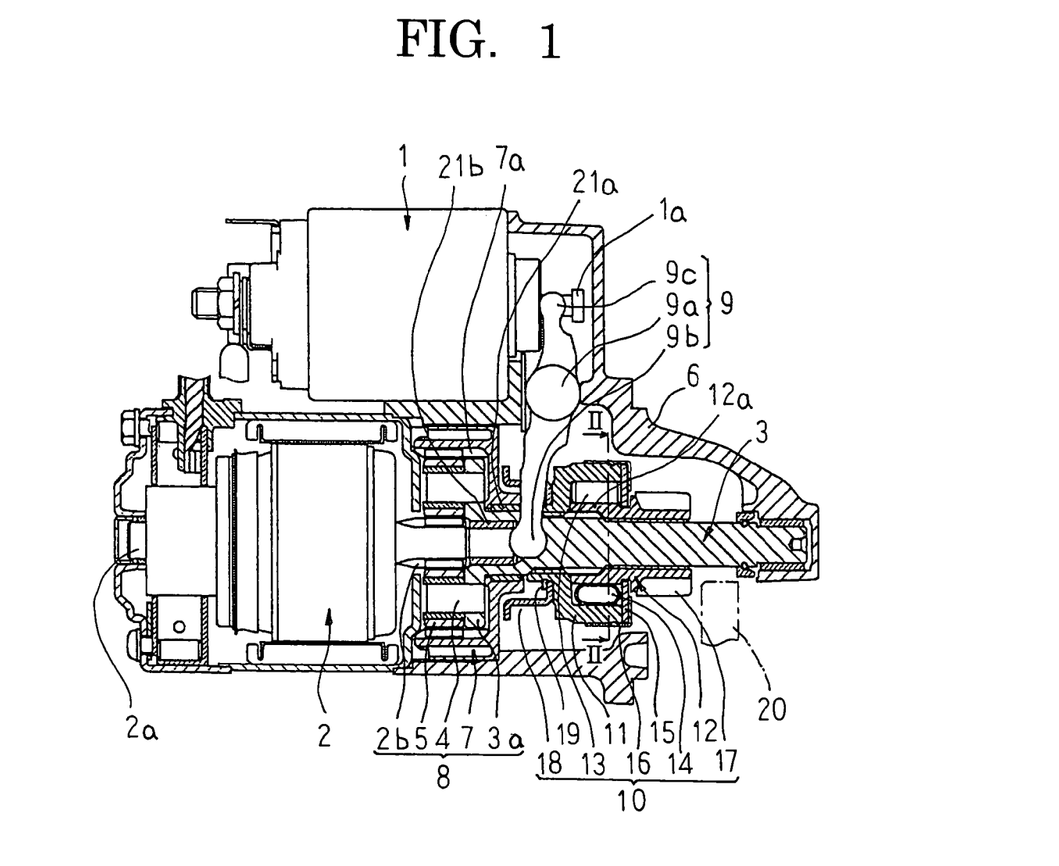
FIG. 1 is a cross section that explains a configuration of a starter motor that uses an overrunning clutch according to Embodiment 1 of the present invention.
Figure 2:
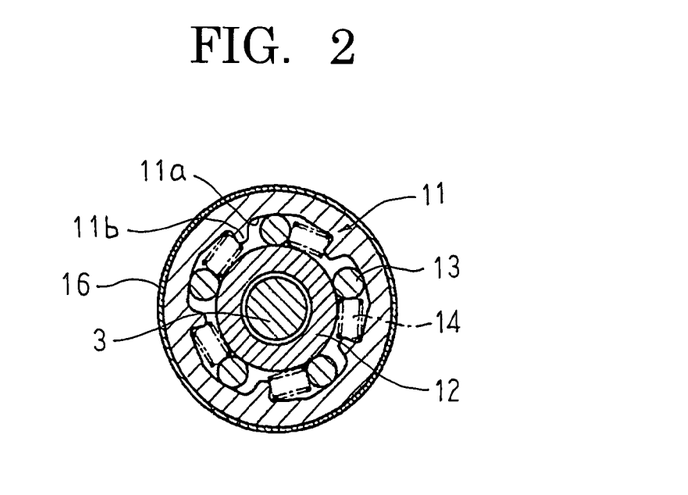
FIG. 2 is a cross section taken along line II-II in FIG. 1 viewed from the direction of the arrows.
Figure 3:
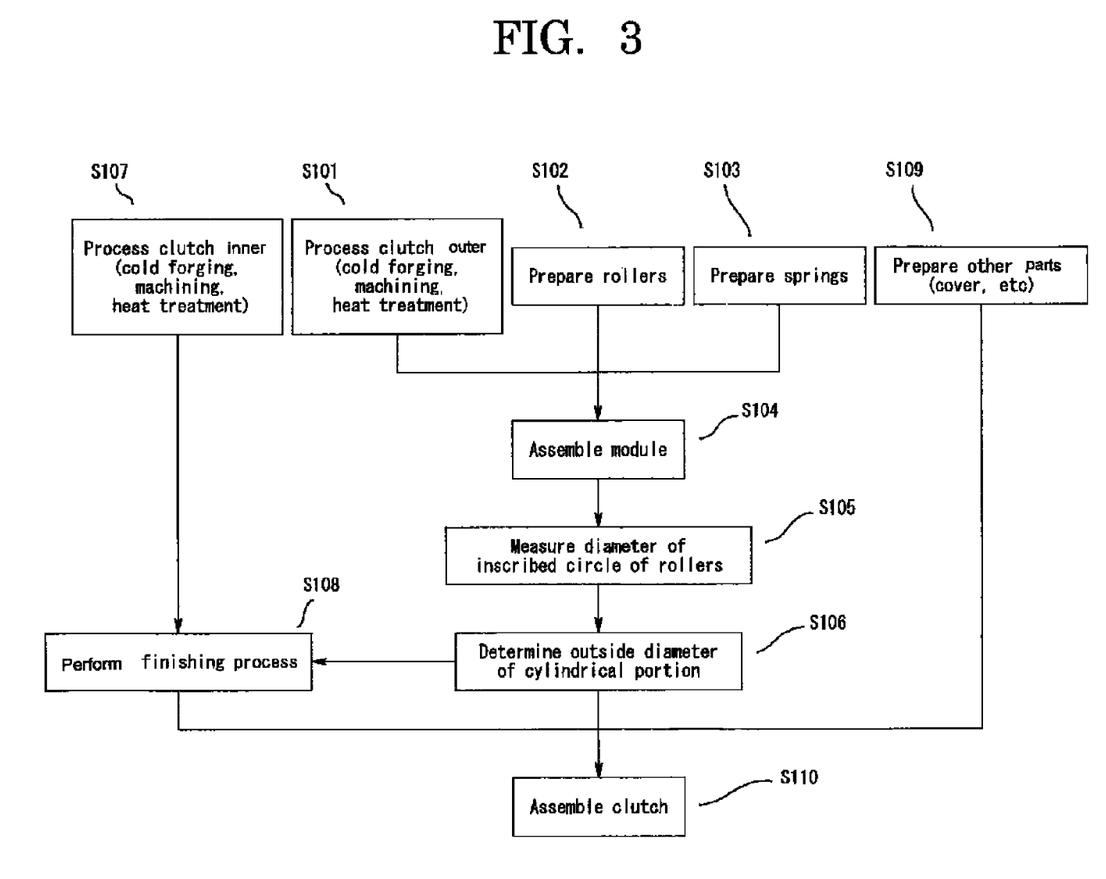
FIG. 3 is a flow chart that explains a method for manufacturing the overrunning clutch according to Embodiment 1 of the present invention.
Figure 4:
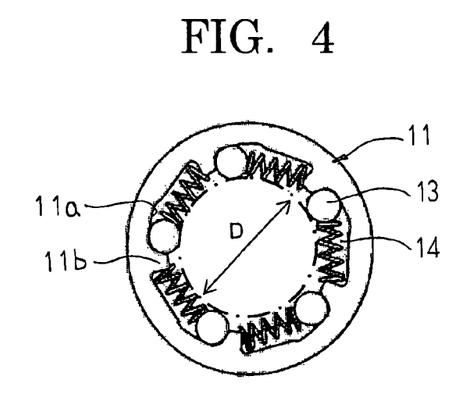
FIG. 4 is a cross section that explains a state in which modules are assembled in the method for manufacturing the overrunning clutch according to Embodiment 1 of the present invention.

FIG. 1 is a cross section that explains a configuration of a starter motor that uses an overrunning clutch according to Embodiment 1 of the present invention, FIG. 2 is a cross section taken along line II-II in FIG. 1 viewed from the direction of the arrows, FIG. 3 is a flow chart that explains a method for manufacturing the overrunning clutch according to Embodiment 1 of the present invention, and FIG. 4 is a cross section that explains a state in which modules are assembled in the method for manufacturing the overrunning clutch according to Embodiment 1 of the present invention. Moreover, in FIG. 1, forward is to the right and rearward is to the left.

In FIGS. 1 and 2, a starter motor is constituted by a motor portion 2 that generates torque; an internal reducing portion 8 that reduces and outputs rotation of the motor portion 2; an overrunning clutch 10 that fits together with an output shaft 3 of the internal reducing portion 8 so as to transmit only unidirectional rotation of the output shaft 3; a pinion 17 that is disposed on the output shaft 3 so as to be slidable together with the overrunning clutch 10; and an electromagnetic switch portion 1 that controls electric current passing to the motor portion 2 and that forces the pinion 17 together with the overrunning clutch 10 toward a ring gear 20 of an engine by means of a shift lever 9, etc.

The electromagnetic switch portion 1 is disposed so as to be positioned outside the motor portion 2 and the internal reducing portion 8 such that a central axis thereof is approximately parallel to the output shaft 3.

The internal reducing portion 8 is constituted by: a sun gear 2b that is formed on an outer circumference at a front end of a motor output shaft 2a; a plurality of planet gears 5 that intermesh with the sun gear 2b; and an internal gear 7 that has an inner circumferential toothed portion 7a that intermeshes with the respective planet gears 5.

The internal gear 7 is a resin-molded body that is formed so as to have a floored cylindrical shape, a central aperture being disposed centrally through a floor portion and the inner circumferential toothed portion 7a being inscribed in an inner wall surface. The internal gear 7 is mounted to a housing 6 so as to envelop the sun gear 2b and such that circumferential movement is restricted.

A disk-shaped flange portion 3a is formed integrally on a rear end of the output shaft 3. A plurality of pins 4 are disposed so as to stand concentrically at a uniform angular pitch on a rear-end surface of the flange portion 3a such that the planet gears 5 are rotatably supported by the respective pins 4. The flange portion 3a, in other words the output shaft 3, is rotatably supported by means of a bearing 21a that is fitted into the central aperture of the internal gear 7, and a front-end portion of the motor output shaft 2a is rotatably supported by means of a bearing 21b that is fitted into the flange portion 3a. Thus, the plurality of planet gears 5 intermesh with the sun gear 2b and the inner circumferential toothed portion 7a to constitute a speed reducing mechanism. Moreover, a front end of the output shaft 3 is rotatably supported by the housing 6.

The sun gear 2b transmits rotation of the motor output shaft 2a to the respective planet gears 5 by rotating together with the motor output shaft 2a. Thus, the planet gears 5 receive the rotation of the sun gear 2b and rotate while revolving around the sun gear 2b. The output shaft 3 is driven to rotate by the revolving action of the planet gears 5.

The overrunning clutch 10 includes: a clutch outer 11 that is mounted so as to be unable to rotate relative to the output shaft 3; a clutch inner 12 that forms wedge-shaped spaces together with the clutch outer 11 as described below; and rollers 13 that are housed inside the wedge-shaped spaces so as to transmit only unidirectional rotation of the clutch outer 11 to the clutch inner 12.

The clutch outer 11 is prepared into a tubular body and is mounted to a portion of the output shaft 3 that projects from the internal reducing portion 8 such that axial movement is possible and rotational motion is transmitted. Tapered notch portions 11a are formed at a uniform pitch circumferentially on an inner circumference of a large diameter portion of the clutch outer 11. In addition, stopping portions 11b that come into contact with and stop the rollers 13 are disposed so as to project inward at predetermined positions at a narrow end of each of the notch portions 11a.

The clutch inner 12 is prepared into a tubular body and is mounted rotatably to the output shaft 3 such that axial movement is possible, and a cylindrical portion 12a that is disposed on a rear end thereof is inserted into an inner circumferential portion of the clutch outer 11. The wedge-shaped spaces are formed between an outer circumference of the cylindrical portion 12a and the notch portions 11a. The pinion 17 is formed integrally on a front end of the clutch inner 12 so as to intermesh with a ring gear 20 together with axial movement of the overrunning clutch 10.

The rollers 13 are prepared so as to have a cylindrical shape, and are mounted into the respective wedge-shaped spaces so as to be movable circumferentially. Springs 14 are disposed so as to press the rollers 13 toward the narrow ends of the wedge-shaped spaces. A plate 15 is disposed so as to close the large diameter portion of the clutch outer 11 and prevent axial movement of the rollers 13 and the springs 14. In addition, the plate 15 is held on the clutch outer 11 by mounting a cover 16 so as to be fitted over the clutch outer 11.

A floating collar 18 is disposed on the clutch outer 11 so as to engage with the shift lever 9, and a retaining ring 19 secures the floating collar 18 to the clutch outer 11.

The shift lever 9 is mounted so as to be pivotable around an intermediate supporting point 9a, a first end 9b thereof is engaged in the floating collar 18 of the overrunning clutch 10, and a second end 9c thereof is coupled to a plunger 1a of the electromagnetic switch portion 1 that is mounted above the motor portion 2.

Operation of a starter motor that is configured in this manner will now be explained.

First, when starting the engine, the electromagnetic switch portion 1 is activated when a key switch (not shown) is switched ON, and current is supplied to the motor portion 2 from a battery (not shown), generating torque. The torque that is generated by the motor portion 2 is reduced in speed by the speed reducing mechanism that is constituted by the sun gear 2b, the planet gears 5, and the inner circumferential toothed portion 7a that are disposed at the front end of the motor output shaft 2a, and is transmitted to the output shaft 3.

When the electromagnetic switch portion 1 is activated, the shift lever 9 is also pivoted around the supporting point portion 9a, and the overrunning clutch 10 slides forward along the output shaft 3, i.e., toward the ring gear 20.

Then, when the pinion 17 intermeshes with the ring gear 20, the torque that has been transmitted to the output shaft 3 from the internal reducing portion 8 is transmitted from the clutch outer 11 through the rollers 13 to the clutch inner 12, and is also transmitted from the pinion 17 to the ring gear 20, starting the engine.

Once the engine has started and rotational speed of the engine is high, torque that is transmitted from the ring gear 20 of the engine through the pinion 17 to the clutch inner 12 is blocked from being transmitted to the clutch outer 11 by the rollers 13 moving toward wide ends of the wedge-shaped spaces. Thus, the motor portion 2 prevented from being turned together therewith, preventing the occurrence of damage that results from overspeed.

If the key switch is reset during engine starting, for example, the starter motor will still be rotating due to inertia immediately thereafter, and the engine will also be oscillating repeatedly between normal rotation and reverse rotation. If the starter motor is then activated during reverse rotation, there is a risk that abnormal impact forces may be generated. In such cases, the rollers 13 move toward the narrow ends of the wedge-shaped spaces and come into contact with the stopping portions 11b. Thus, movement of the rollers 13 toward the narrow ends of the wedge-shaped spaces is prevented, and slippage occurs between the rollers 13 and the clutch inner 12. The occurrence of damage to internal parts of the starter motor and the ring gear 20 of the engine that results from excessive torque is thereby suppressed.

Next, a method for manufacturing an overrunning clutch 10 will be explained with reference to FIG. 3.

First, a tubular clutch outer 11 in which tapered notch portions 11a and stopping portions 11b are formed is prepared by cold forging. Next, portions that cannot be formed precisely by cold forging such as end surfaces, etc., are formed by machining. Heat treatment is subsequently applied to obtain a clutch outer 11 in which mechanical strength is ensured (S101). Rollers 13 and springs 14 are prepared (S102, S103), and other parts such as a cover 16, etc., are also prepared (S109).

Next, a module is assembled by mounting the rollers 13 and the springs 14 into the respective notch portions 11a of the clutch outer 11 (S104). In this state, the rollers 13 are placed in contact with inner wall surfaces and the stopping portions 11b of the notch portions 11a by pressure from the springs 14, as shown in FIG. 4. Then, a diameter of a circle that is inscribed by the plurality of rollers 13, i.e., an inscribed circle diameter D, is measured while maintaining this state (S105). Next, an outside diameter of a cylindrical portion 12a of a clutch inner 12 is determined from the measured value such that the amount of bite when the rollers 13 are placed in contact with the stopping portions 11b is at a desired predetermined value (S106).

A tubular clutch inner 12 is similarly prepared by cold forging. Then, portions that cannot be formed precisely by cold forging such as end surfaces, etc., are formed by machining. Heat treatment is subsequently applied to obtain a clutch inner 12 in which mechanical strength is ensured (S107).

Next, a cylindrical portion 12a of the clutch inner 12 is finished such that the outside diameter of the cylindrical portion 12a is at the determined value of the outside diameter that was determined at S106 (S108).

Then, an overrunning clutch is assembled by pairing together the clutch outer 11, rollers 13, and springs 14 that were prepared in order to determine the outside diameter of the cylindrical portion 12a and the clutch inner 12 that was finished based on that determined value of the outside diameter, and combining them with grease, and other parts, etc. (S110).

Thus, according to Embodiment 1, the rollers 13 and the springs 14 are installed in the notch portions 11a of the produced clutch outer 11, the inscribed circle diameter D of the rollers 13 is measured, the outside diameter of the cylindrical portion 12a is determined from the measured value such that the amount of bite of the rollers 13 is at the desired predetermined value, and the outside diameter of the cylindrical portion 12a of the clutch inner 12 is finished so as to have that determined value of the outside diameter. Then, an overrunning clutch is assembled by pairing together the clutch outer 11, the rollers 13, and the springs 13 that were assembled into order to determine the outside diameter of the cylindrical portion 12a for the clutch inner in which the cylindrical portion has been finished, and the clutch inner 12 that has been finished with the determined value of the outside diameter determined from that measured value of the inscribed circle diameter.

Thus, the measured value of the inscribed circle diameter is a value specific to each module in which a clutch outer 11, rollers 13, and springs 14 are assembled, and is not affected by irregularities in the inner circumferential radii of the notch portions 11a, irregularities in the positions of formation of the stopping portions 11b, quench warping, or irregularities in the outside diameters of the rollers in the clutch outer 11. Similarly, the determined value of the outside diameter of the cylindrical portion 12a that is determined based on the measured value of the inscribed circle diameter is also not affected by these manufacturing irregularities. Consequently, the amount of bite when the rollers 13 are placed in contact with the stopping portions 11b can be ensured to be at a desired predetermined value with high precision, also enabling irregularities in the upper limit of the transmitted torque to be suppressed.

Because it is not necessary to consider irregularities in each of the parts, it is no longer necessary to set higher target values for each of the parts, thereby suppressing increases in size and avoiding increases in the size and weight of the machinery.

The cylindrical portion 12a of the clutch inner 12 is finished so as to match the clutch outer 11, and intermediate work in process is eliminated, making it possible to save storage space, and also to reduce management expenses, unnecessary part machining costs, etc., enabling manufacturing costs to be reduced.

Because the rollers 13 and the springs 14 are installed in the respective notch portions 11a of the clutch outer 11 and the inscribed circle diameter of the rollers 13 is measured in a state in which the rollers 13 are respectively placed in contact with the stopping portions 11b by the pressure from the springs 14, measuring instruments such as three-dimensional measuring instruments, etc., are unnecessary, enabling the inscribed circle diameter to be measured easily and with high precision.

Now, in Embodiment 1 above, the outside diameter of the cylindrical portion 12a is determined from the measured value of the inscribed circle diameter such that the amount of roller bite is at a desired predetermined value, but the desired predetermined value is a value that can also be appropriately set to match specifications of the overrunning clutch as follows:

The amount of bite of the rollers 13 is calculated based on the differences between the inscribed circle diameter and the outside diameter of the cylindrical portion 12a. The upper limit of the transmitted torque depends on the amount of bite of the rollers 13. Thus, the upper limit of the transmitted torque is determined so as to match the specifications of the overrunning clutch, and the amount of bite of the rollers 13 is determined so as to obtain the determined upper limit of the transmitted torque. Then, the outside diameter of the cylindrical portion 12a is determined from the measured value of the inscribed circle diameter so as to obtain the determined amount of bite of the rollers 13.

Embodiment 2

Figure 5:
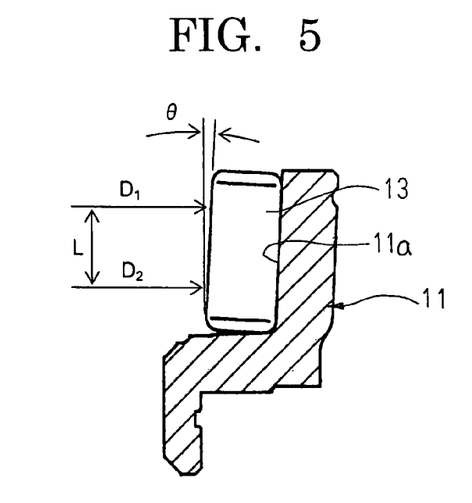
FIG. 5 is a diagram that explains a step in which a diameter of an inscribed circle of rollers is measured in a method for manufacturing an overrunning clutch according to Embodiment 2 of the present invention.
Figure 6:
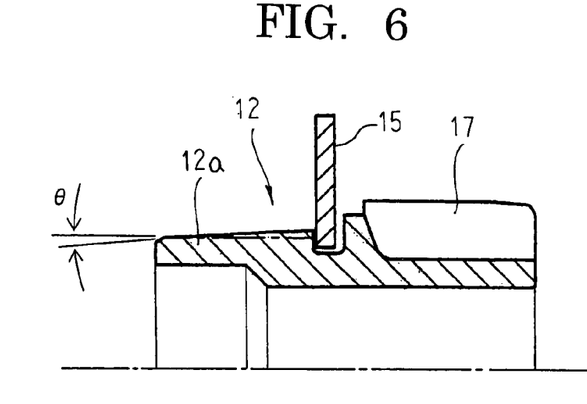
FIG. 6 is a cross section of a cylindrical portion of a finished clutch inner in the method for manufacturing the overrunning clutch according to Embodiment 2 of the present invention.

FIG. 5 is a diagram that explains a step in which a diameter of an inscribed circle of rollers is measured in a method for manufacturing an overrunning clutch according to Embodiment 2 of the present invention, and FIG. 6 is a cross section of a cylindrical portion of a finished clutch inner in the method for manufacturing the overrunning clutch according to Embodiment 2 of the present invention.

In Embodiment 2, a module is assembled by mounting rollers 13 and springs 14 into respective notch portions 11a of a clutch outer 11, then inscribed circle diameters $D_1$ and $D_2$ of the plurality of rollers 13 are measured at two positions that are separated by a distance L axially. Next, an inclination θ of the rollers 13 is calculated from these measured values based on the following expression:

$$\theta = \tan^{-1}\{(D_1 - D_2)/2L\}$$

Next, an outside diameter of a cylindrical portion 12a of a clutch inner 12 is determined from the measured values such that the amount of bite when the rollers 13 are placed in contact with stopping portions 11b is at a desired predetermined value.

Then, the outside diameter of the cylindrical portion 12a of the clutch inner 12 is finished so as to have the determined value and so as to have an inclination that is equal to θ.

Similar effects to those in Embodiment 1 above can also be achieved in Embodiment 2.

According to Embodiment 2, because the cylindrical portion 12a is finished so as to conform to the inclination θ of the rollers 13, canting of the rollers 13 that results from deformation of the notch portions 11a due to heat treatment of the clutch outer 11 can also be accounted for, enabling irregularities in the upper limit of the transmitted torque to be suppressed.

Embodiment 3

Figure 7:
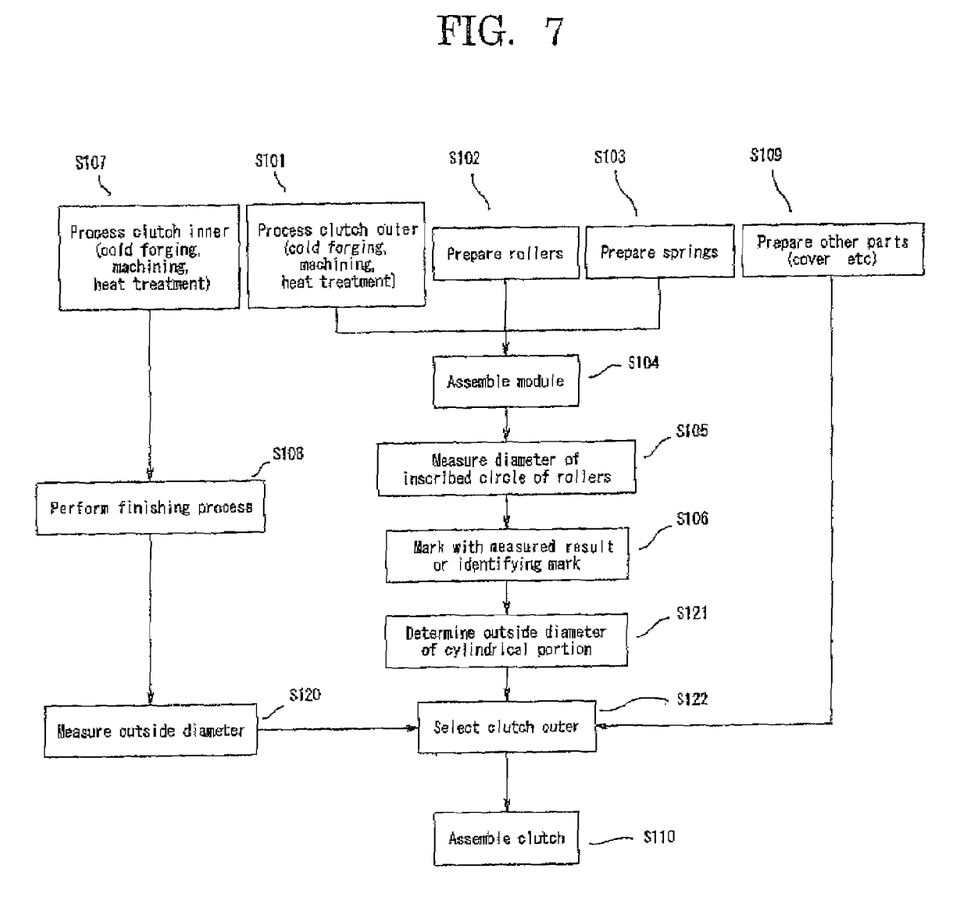
FIG. 7 is a flow chart that explains a method for manufacturing an overrunning clutch according to Embodiment 3 of the present invention.

FIG. 7 is a flow chart that explains a method for manufacturing an overrunning clutch according to Embodiment 3 of the present invention.

In Embodiment 3, first a tubular clutch outer 11 in which tapered notch portions 11a and stopping portions 11b are formed is also prepared by cold forging. Next, portions that cannot be formed precisely by cold forging such as end surfaces, etc., are formed by machining. Heat treatment is subsequently applied to obtain a clutch outer 11 in which mechanical strength is ensured (S101). Rollers 13 and springs 14 are prepared (S102, S103), and other parts such as a cover 16, etc., are also prepared (S109).

Next, a module is assembled by mounting the rollers 13 and the springs 14 into the respective notch portions 11a of the clutch outer 11 (S104). Then, a diameter of a circle that is inscribed by the plurality of rollers 13, i.e., an inscribed circle diameter D, is measured while maintaining a state in which the rollers 13 are placed in contact with inner wall surfaces and the stopping portions 11b of the notch portions 11a by pressure from the springs 14 (S105). Next, this measured value of the inscribed circle diameter is marked on the clutch outer 11 (S106). A plurality of types of clutch outer 11 that have different measured values of the inscribed circle diameter are prepared in this manner.

Next, a tubular clutch inner 12 is prepared by cold forging. Then, portions that cannot be formed precisely by cold forging such as end surfaces, etc., are formed by machining. Heat treatment is subsequently applied to obtain a clutch inner 12 in which mechanical strength is ensured (S107).

Then, a cylindrical portion 12a of the clutch inner 12 is finished (S108), and the outside diameter of that cylindrical portion 12a is measured (S120).

Next, the outside diameter of the cylindrical portion 12a is determined from the measured value of the inscribed circle diameter marked on the clutch outer 11 and the desired amount of bite of the rollers 13 (S121). Then, a clutch outer 11, rollers 13, and springs 14 that have a determined value of the outside diameter that conforms to the measured value of the outside diameter are selected (S122).

Then, an overrunning clutch is assembled by pairing together the prepared clutch inner 12 and the selected clutch outer 11, rollers 13, and springs 14, and combining them with grease, and other parts, etc. (S110).

Similar effects to those in Embodiment 1 above can also be achieved in Embodiment 3.

According to Embodiment 3, because the measured value of the inscribed circle diameter that is a measured result is marked on the clutch outer 11, even if a failure occurs in a subsequent step, the origin of the clutch outer 11 is clear, enabling that clutch outer 11 to be reused without having to measure the inscribed circle diameter again.

Because a plurality of types of clutch outer 11 that have different inscribed circle diameters are prepared in advance and are paired together by selecting from the plurality of types of clutch outer 11 a clutch outer 11 that has an inscribed circle diameter that conforms to the outside diameter of the cylindrical portion 12a of the clutch inner 12, the clutch outer 11 and the clutch inner 12 can be prepared separately and are suitable for mass production.

Moreover, in Embodiment 3 above, the measured value of the inscribed circle diameter that is a measured result is marked on the clutch outer 11, but the part on which the measured result is marked is not limited to the clutch outer 11, and may also be an accessory of the clutch outer 11 such as the floating collar 18, for example.

In Embodiment 3 above, the measured value of the inscribed circle diameter that is a measured result is marked on the clutch outer 11, but if the measured result data is managed by computer, an identifying mark that substitutes for the measured result such as a lot number, or a date and time processed, etc., may also be marked on the clutch outer 11 at S106 in FIG. 7. In that case, it is possible to determine the measured value of the inscribed circle diameter that is the measured result from the identifying mark that is used.

Embodiment 4

Figure 8:
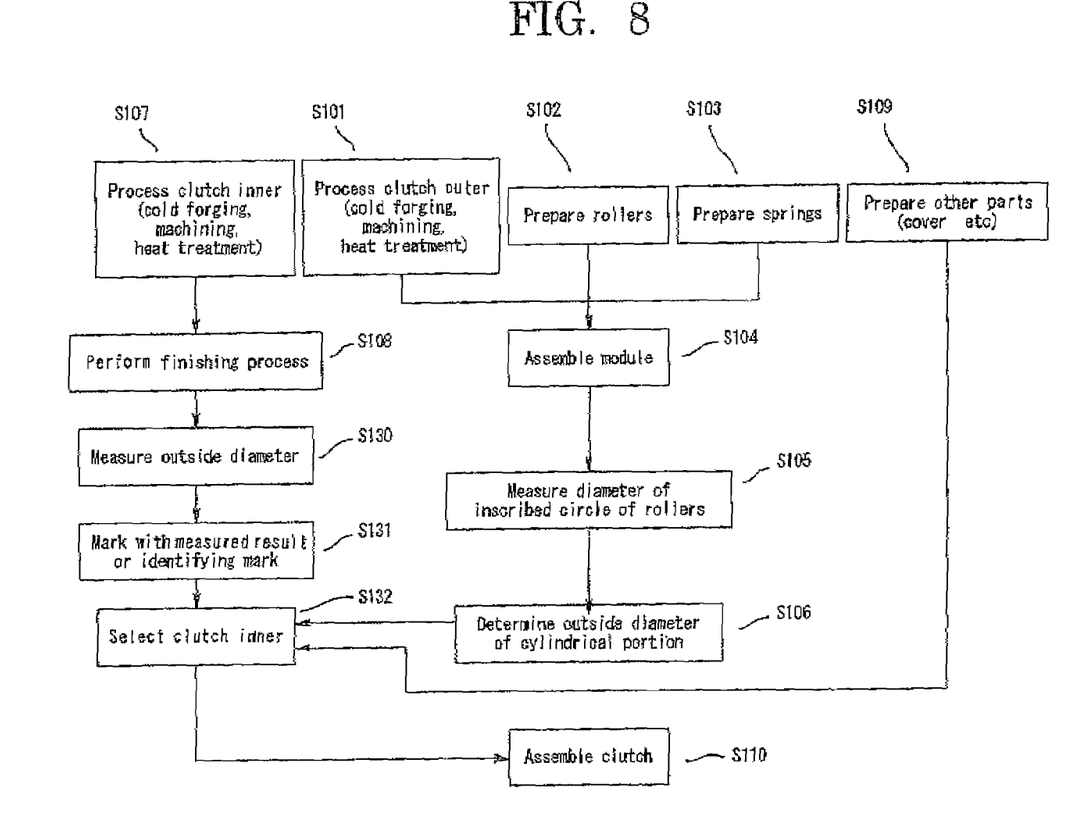
FIG. 8 is a flow chart that explains a method for manufacturing an overrunning clutch according to Embodiment 4 of the present invention.

FIG. 8 is a flow chart that explains a method for manufacturing an overrunning clutch according to Embodiment 4 of the present invention.

In Embodiment 4, first a tubular clutch outer 11 in which tapered notch portions 11a and stopping portions 11b are formed is also prepared by cold forging. Next, portions that cannot be formed precisely by cold forging such as end surfaces, etc., are formed by machining. Heat treatment is subsequently applied to obtain a clutch outer 11 in which mechanical strength is ensured (S101). Rollers 13 and springs 14 are prepared (S102, S103), and other parts such as a cover 16, etc., are also prepared (S109).

Next, a tubular clutch inner 12 is prepared by cold forging. Then, portions that cannot be formed precisely by cold forging such as end surfaces, etc., are formed by machining. Heat treatment is subsequently applied to obtain a clutch inner 12 in which mechanical strength is ensured (S107).

Then, a cylindrical portion 12a of the clutch inner 12 is finished (S108), and the outside diameter of that cylindrical portion 12a is measured (S130). Next, this measured value of the outside diameter is marked on the clutch inner 12 (S131). A plurality of types of clutch inner 12 that have different measured values of the outside diameter are prepared in this manner.

Next, a module is assembled by mounting the rollers 13 and the springs 14 into the respective notch portions 11a of the clutch outer 11 (S104). Then, a diameter of a circle that is inscribed by the plurality of rollers 13, i.e., an inscribed circle diameter D, is measured while maintaining a state in which the rollers 13 are placed in contact with inner wall surfaces and the stopping portions 11b of the notch portions 11a by pressure from the springs 14 (S105). Next, the outside diameter of the cylindrical portion 12a is determined from this measured value of the inscribed circle diameter and the desired amount of bite of the rollers 13 (S106).

Next, a clutch inner 12 that has a measured value of the outside diameter that conforms to the determined value of the outside diameter is selected from the plurality of types of clutch inner 12 that have been prepared in advance, based on the measured values of the outside diameter thereof (S132). Then, an overrunning clutch is assembled by pairing together the prepared clutch outer 11, rollers 13, and springs 14 and the selected clutch inner 12, and combining them with grease, and other parts, etc. (S110).

Similar effects to those in Embodiment 1 above can also be achieved in Embodiment 4.

According to Embodiment 4, because the measured value of the outside diameter that is a measured result is marked on the clutch inner 12, even if a failure occurs in a subsequent step, the origin of the clutch inner 12 is clear, enabling that clutch inner 12 to be reused without having to measure the outside diameter again.

Because a plurality of types of clutch inner 12 that have cylindrical portions 12a that have different outside diameters are prepared in advance and are paired together by selecting from the plurality of types of clutch inner 12 a clutch inner 12 that has a cylindrical portion 12a that has an outside diameter that conforms to the determined value of the outside diameter that has been determined from the measured value of the inscribed circle diameter in the clutch outer 11, the clutch outer 11 and the clutch inner 12 can be prepared separately and are suitable for mass production.

Moreover, in Embodiment 4 above, the measured value of the outside diameter that is a measured result is marked on the clutch inner 12, but the part on which the measured result is marked is not limited to the clutch inner 12, and may also be an accessory of the clutch inner 12 such as the plate 15, for example.

In Embodiment 4 above, the measured value of the outside diameter that is a measured result is marked on the clutch inner 12, but if the measured result data is managed by computer, an identifying mark that substitutes for the measured result such as a lot number, or a date and time processed, etc., may also be marked on the clutch inner 12 at S131 in FIG. 8. In that case, it is possible to determine the measured value of the outside diameter that is the measured result from the identifying mark that is used.

What is claimed is:

1. A method for manufacturing an overrunning clutch including a tubular clutch outer with a plurality of tapered notch portions formed circumferentially on an inner circumferential portion, a clutch inner having a cylindrical portion disposed at a first end, said cylindrical portion being inserted into said inner circumferential portion of said clutch outer such that wedge-shaped spaces are formed between an outer circumference of said cylindrical portion and said notch portions, rollers mounted into said wedge-shaped spaces so as to be movable circumferentially, springs that press said rollers toward narrow ends of said wedge-shaped spaces, and stopping portions that are disposed on said inner circumferential portion of said clutch outer so as to project inward at narrow end positions of each of said wedge-shaped spaces, wherein a driving force is transmitted from said clutch outer through said rollers to said clutch inner by unidirectional rotation, said method comprising:

installing said rollers and said springs in each of said notch portions of said clutch outer;

measuring an inscribed circle diameter of said rollers at two or more positions that differ in an axial direction of said rollers in a state in which said rollers are respectively placed in contact with said stopping portions by pressure from said springs; and determining an outside diameter of said cylindrical portion from a measured value of said inscribed circle diameter such that an amount of roller bite is at a predetermined amount at a position at which said rollers come into contact with said stopping portions.

2. The method of claim 1, wherein:

said cylindrical portion is finished such that said outside diameter of said cylindrical portion of said clutch inner is at a determined value of said outside diameter; and said clutch inner in which said cylindrical portion has been finished and said clutch outer in which said inscribed circle diameter of said rollers was measured in order to determine said outside diameter of said cylindrical portion are paired together.

3. The method of claim 2, wherein said measured value of said outside diameter of said cylindrical portion or an identifying mark that represents said measured value of said outside diameter is marked on said clutch inner in which said outside diameter has been measured, or on an accessory of said clutch inner.

4. The method of claim 1, wherein:

a plurality of types of said clutch outer that have different inscribed circle diameters are prepared;

said outside diameter of said cylindrical portion is determined from a measured value of said inscribed circle diameter in said plurality of types of clutch outer;

said cylindrical portion of said clutch inner is finished and an outside diameter of said cylindrical portion is measured;

a clutch outer that has a determined value of said outside diameter that conforms to said measured value of said outside diameter is selected from said plurality of types of clutch outer; and said selected clutch outer and said clutch inner in which said outside diameter of said cylindrical portion was measured are paired together.

5. The method of claim 1, wherein:

a plurality of types of said clutch inner that have different outside diameters in said cylindrical portion are finished before measuring said inscribed circle diameter of said rollers;

a clutch inner that has an outside diameter of said cylindrical portion that conforms to a determined value of said outside diameter is selected from said plurality of types of clutch inner; and, said selected clutch inner and said clutch outer in which said inscribed circle diameter of said rollers was measured in order to determine said outside diameter of said cylindrical portion are paired together.

6. The method of claim 1, wherein:

an inclination of said rollers is calculated from said measured values of said inscribed circle diameter; and said cylindrical portion is finished so as to have a tapered shape that matches said calculated inclination.

7. The method of claim 6, wherein the rollers are inclined based on the following expression:

$$\theta = \tan^{-1}\{(D_1 - D_2)/2L\},$$

wherein $D_1$ and $D_2$ comprise measured values of the diameter of the plurality of roller, and L represents a distance between measurement positions of the measured values.

8. The method of claim 1, wherein said measured value of said inscribed circle diameter of said rollers or an identifying mark that represents said measured value of said inscribed circle diameter is marked on said clutch outer in which said inscribed circle diameter has been measured or on an accessory of said clutch outer.

9. An overrunning clutch, comprising:

a tubular clutch outer that has a plurality of tapered notch portions formed circumferentially on an inner circumferential portion;

a clutch inner that has a cylindrical portion disposed at a first end, said cylindrical portion being inserted into said inner circumferential portion of said clutch outer such that wedge-shaped spaces are formed between an outer circumference of said cylindrical portion and said notch portions;

rollers that are mounted into said wedge-shaped spaces so as to be movable circumferentially;

springs that press said rollers toward narrow ends of said wedge-shaped spaces; and stopping portions that are disposed on said inner circumferential portion of said clutch outer so as to project inward at narrow end positions of each of said wedge-shaped spaces, wherein a driving force is transmitted from said clutch outer through said rollers to said clutch inner by unidirectional rotation, further wherein an outside diameter of the cylindrical portion is based on a measured value of an inscribed circle diameter of said rollers when said rollers contact said stopping portions by pressure from said springs, such that an amount of roller bite is at a predetermined amount at a position at which said rollers contact said stopping portions, and wherein said inscribed circle diameter comprises two or more measurement positions that differ in an axial direction of said rollers in said state in which each of said rollers is placed in contact with said stopping portions by pressure from said springs.

10. The overrunning clutch of claim 9, wherein:

said outside diameter of said cylindrical portion of said clutch inner is at a determined value of said outside diameter; and said clutch inner in which said cylindrical portion has been finished is paired together with said clutch outer in which said inscribed circle diameter of said rollers was measured to determine said outside diameter of said cylindrical portion.

11. The overrunning clutch of claim 10, further comprising said measured value of said outside diameter of said cylindrical portion or an identifying mark that represents said measured value of said outside diameter, located on said clutch inner in which said outside diameter has been measured or on an accessory of said clutch inner.

12. The overrunning clutch of claim 9, wherein:

a plurality of types of said clutch outer that have different inscribed circle diameters;

said outside diameter of said cylindrical portion is based on a measured value of said inscribed circle diameter in said plurality of types of clutch outer;

said cylindrical portion of said clutch inner is finished and an outside diameter of said cylindrical portion is measured;

a clutch outer having a determined value of said outside diameter that conforms to said measured value of said outside diameter comprises one of said plurality of types of clutch outer; and said selected clutch outer is paired with said clutch inner in which said outside diameter of said cylindrical portion was measured.

13. The overrunning clutch of claim 9, wherein:

a plurality of types of said clutch inner have different outside diameters in said cylindrical portion are configured to be finished without said inscribed circle diameter of said rollers;

a clutch inner of said plurality of types of clutch inner having an outside diameter of said cylindrical portion conforms to a determined value of said outside diameter is selected from said plurality of types of clutch inner; and said selected clutch inner is paired with said clutch outer in which said inscribed circle diameter of said rollers was measured to determine said outside diameter of said cylindrical portion.

14. The overrunning clutch of claim 9, wherein:

said rollers are inclined based on said measured values of said inscribed circle diameter; and said cylindrical portion comprises a tapered shape that matches said calculated inclination.

15. The overrunning clutch of claim 14, wherein the rollers are inclined based on the following expression:

$$\theta = \tan^{-1}\{(D_1 - D_2)/2L\},$$

wherein $D_1$ and $D_2$ comprise measured values of the diameter of the plurality of roller, and L represents a distance between measurement positions of the measured values.

16. The overrunning clutch of claim 9, further comprising said measured value of said inscribed circle diameter of said rollers or an identifying mark that represents said measured value of said inscribed circle diameter, located on said clutch outer in which said inscribed circle diameter has been measured or on an accessory of said clutch outer.

* * * * *